June 23, 1959  C. J. POLITIS  2,891,280
METHOD AND APPARATUS FOR FORMING HOLLOW PLASTIC ARTICLES
Filed Feb. 21, 1955  3 Sheets-Sheet 1

INVENTOR.
Charles J. Politis
BY:
Olson & Trexler
Attys.

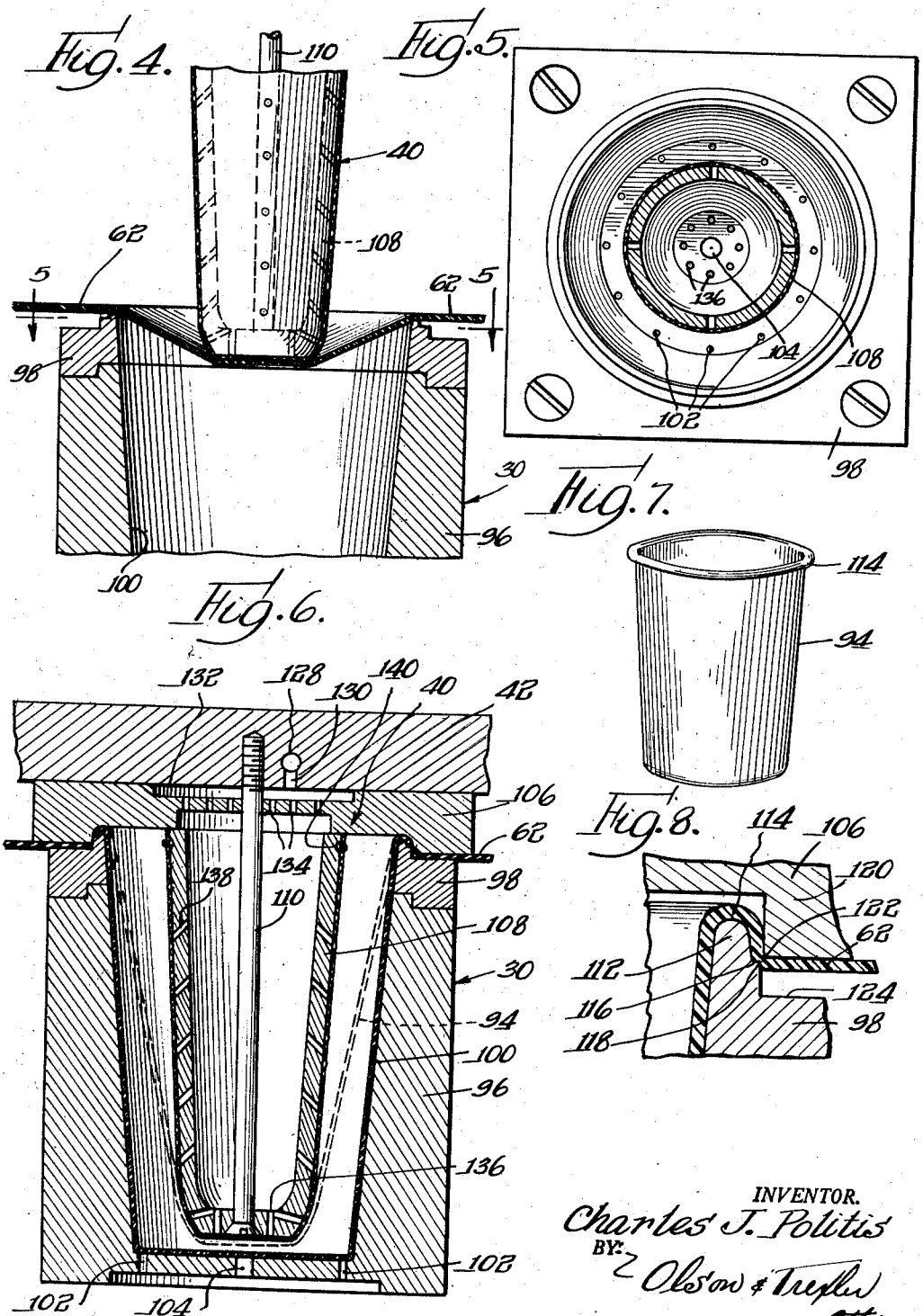

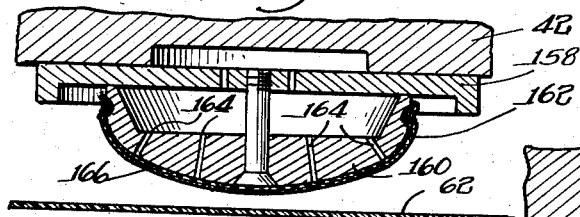
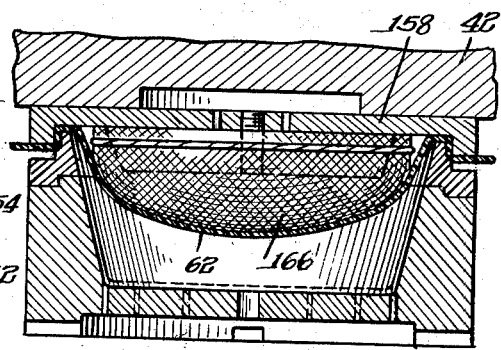
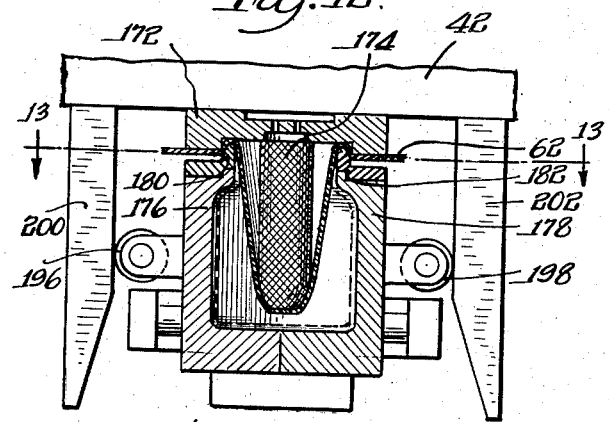
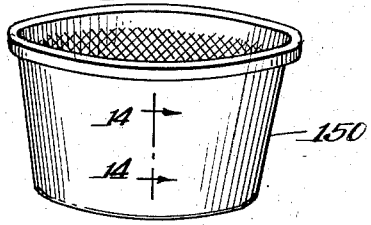
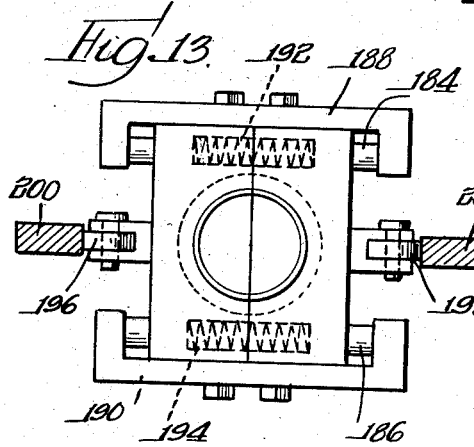
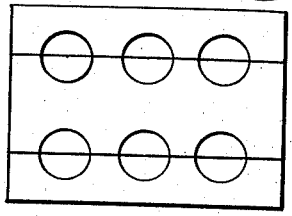
INVENTOR.
Charles J. Politis
BY:
Olson & Trexler
Attys.

United States Patent Office 2,891,280
Patented June 23, 1959

2,891,280

METHOD AND APPARATUS FOR FORMING HOLLOW PLASTIC ARTICLES

Charles J. Politis, Athens, Greece, assignor to United States Products Corporation, a corporation of Delaware Application February 21, 1955, Serial No. 489,514

6 Claims. (Cl. 18—19)

The present invention relates to a novel method and apparatus for forming containers or similar hollow articles and more particularly to a novel method and apparatus for forming containers or hollow articles from sheets of plastic material.

It has heretofore been proposed that relatively shallow containers or similar articles may be formed from a sheet of plastic material by mechanically shaping plastic material with a plunger and pressing the material against the interior surface of a mold with the plunger. It has also been suggested that such relatively shallow articles may be produced by partially forming the sheet material around a plunger, then pressing an upper marginal portion of the partially formed container against the inner surface of a mold, and then forcing air through a plurality of ports in the plunger to expand the lower portion of the partially formed container into contact with the remainder of the mold. While these prior suggestions may be satisfactory for some purposes, it has been found that they are subject to several disadvantages. For example, various portions of the plastic sheet material may be stretched or drawn different amounts so that the resulting article has an objectionable variable wall thickness and also objectionable irregular flow lines appearing in the wall whereby the article is not readily marketable as a result of inadequate strength or ruggedness and unpleasant appearance. Furthermore, it has been necessary to utilize relatively thick sheet material or to form the walls of such prior containers relatively thick so that the weight of plastic material in each container is unnecessarily high, and since the plastic material is expensive as compared with paper and the like, it has been difficult to obtain plastic containers which can compete pricewise with similar paper containers. In addition, no practical method and apparatus has heretofore been suggested for forming relatively deep containers from sheets of plastic material, or in other words, containers or hollow articles having a depth substantially greater than the diameter thereof, nor have such prior suggestions been capable of producing a satisfactory marketable plastic container from sheet material, which container has a restricted mouth and may, for example, be used as a milk bottle.

An important object of the present invention is to provide a novel method and apparatus for economically forming hollow articles or containers from a sheet of plastic material while at the same time providing articles which are sufficiently rugged and which have a pleasing appearance so that they are readily marketable.

A more specific object of the present invention is to provide a novel method and apparatus for forming containers and the like from sheet material in a manner so as to provide these containers with a controlled wall thickness throughout, with the wall being paperthin, if desired, so as substantially to reduce the weight of plastic material required for each container and thereby the cost of each container.

Another more specific object of the present invention is to provide a novel method and apparatus for forming containers and the like from a sheet of plastic material wherein differential air pressure between opposite sides of the sheet is utilized to force the sheet material against the surface of a mold without causing undesirable variations in the wall thickness of the finished article, and without causing undesirable flow lines to be formed in the sheet material.

Still another object of the present invention is to provide a novel method and apparatus of the above described type whereby strengthening and rigidifying formations may be formed in the sheet material during the shaping thereof into a container or the like, which formations are located on the interior surface of the container so as not to detract from the appearance thereof.

Another object of the present invention is to provide a novel method and apparatus of the above described type which enables deep containers or containers having a depth substantially greater than the height and/or a restricted mouth to be formed from sheet material in a manner so that such containers are economical, rugged and of pleasing appearance and therefore marketable.

Still another object of the present invention is to provide a novel method and apparatus of the above described type whereby a plurality of containers or similar hollow articles may be simultaneously formed from a sheet of plastic material so as further to promote economical production thereof.

A still further object of the present invention is to provide a novel method and apparatus of the above described type for forming articles from a continuous sheet of plastic material whereby handling and transferring of the sheet material stock and the articles from and to various work stations is reduced and simplified in order further to promote economical production of the articles.

A more specific object of the present invention is to provide a novel method and apparatus of the type referred to in the preceding paragraph wherein a continuous sheet of plastic material is fed directly from an extruding mechanism or other mechanism for forming the sheet to an article forming mechanism.

Other objects and advantages of the present invention will become apparent from the following description and the accompanying drawings wherein:

Fig. 4 is an enlarged fragmentary sectional view showing a portion of the novel container forming means of the present invention;

Fig. 5 is a sectional view taken along line 5—5 in Fig. 4;

Fig. 6 is a sectional view similar to Fig. 4 but showing the relationship of the plunger and mold after the article or container has been fully formed;

Fig. 7 is a perspective view showing a container or cup which may be formed by the novel method and apparatus of this invention;

Fig. 8 is an enlarged fragmentary sectional view showing a portion of the novel article forming means in greater detail;

Fig. 9 is a fragmentary sectional view showing a modified form of the novel plunger and mold means of the present invention;

Fig. 10 is a sectional view showing the plunger and mold of Fig. 9 in container forming relationship;

Fig. 11 is a perspective view showing a container which may be formed by the means shown in Figs. 9 and 10;

Fig. 12 is a fragmentary sectional view showing another modified form of the present invention;

Fig. 13 is a sectional view taken along line 13—13 in Fig. 12;

Fig. 14 is an enlarged fragmentary sectional view taken along line 14—14 in Fig. 11; and Fig. 15 is a plan view showing a multiple cavity mold embodying the features of the structure shown in Figs. 12 and 13.

Figure 1:
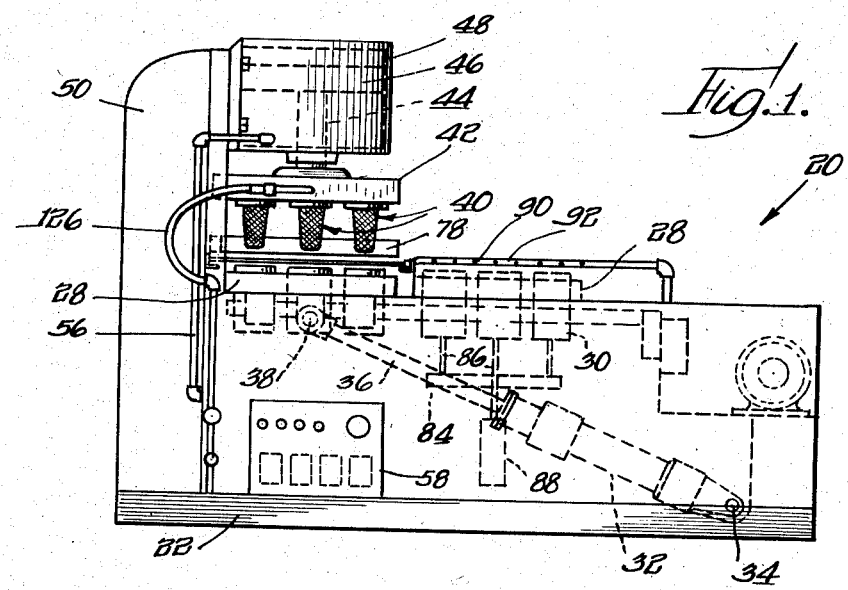
Fig. 1 is an elevational view of an apparatus embodying the principles of this invention.
Figure 2:
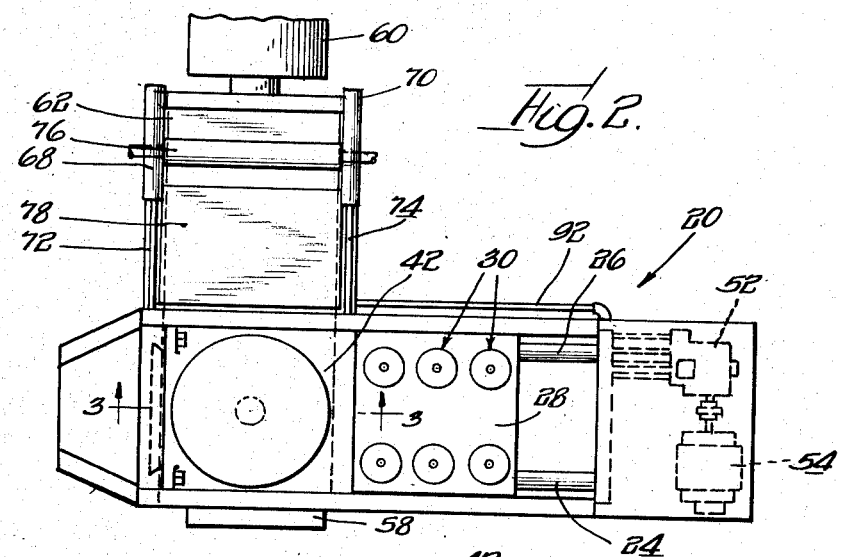
Fig. 2 is a plan view of the apparatus of this invention.
Figure 3:
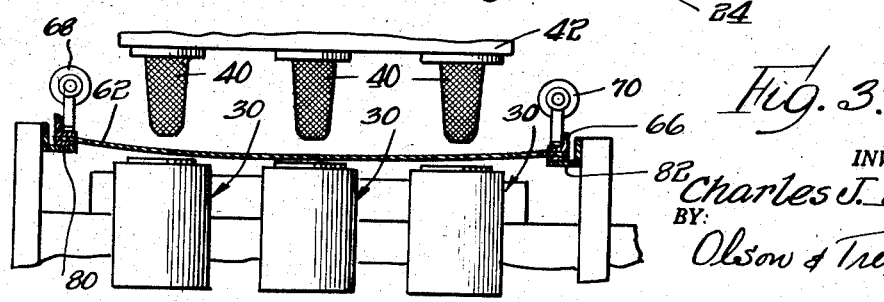
Fig. 3 is an enlarged fragmentary sectional view taken along line 3—3 in Fig. 2.

Referring now more specifically to the drawings wherein like parts are designated by the same numerals throughout the various figures, an apparatus 20 embodying certain features of the present invention is shown in Figs. 1 and 2. This apparatus includes a base structure 22 having a pair of rails 24 and 26 thereon which slidably support a platen 28 for movement to and from the solid and the broken line positions. The platen 28 is adapted to support a plurality of molds 30 which are described fully hereinbelow. Means including a hydraulic cylinder 32 pivotally mounted to the base as at 34 and having a piston rod 36 extending therefrom and interconnected with the platen as at 38 is provided for reciprocating the platen. A plurality of plunger and die means 40 is mounted on a platen 42 for cooperation with the molds. The platen 42 is connected with the lower end of a plunger 44 extending from a piston 46 slidably mounted in a cylinder 48. The cylinder is supported by an upstanding beam 50 of the base structure. Hydraulic fluid under pressure for actuating the cylinders is provided by a pump 52 which is driven by an electric motor 54, which pump is connected with opposite ends of the double acting cylinder 32 by suitable conduits, not shown, and with the lower end of the cylinder 48 by suitable conduit means including conduit 56. A control panel 58 includes various timing devices and control valves for controlling the operation of the cylinders 32 and 48 as well as other elements of the apparatus to be described below, and since the timing devices and control valves may be constructed and arranged in a known manner, they need not be described in detail.

In accordance with the present invention, the containers or other hollow articles are preferably formed from a continuous sheet of organic thermo-plastic material such as polystyrene or modified polystyrene. In accordance with the preferred form of the present invention, the sheet of plastic material is preferably fed directly from means for extruding or otherwise forming the sheet to a work station between the plungers and molds. Thus, as shown in Fig. 2, an extruding apparatus 60 of known construction is disposed adjacent the apparatus 20 and is adjusted to form a continuous sheet 62 of thermo-plastic material at a substantially uniform rate, which rate is determined by the rate of operation of the apparatus 20. The sheet is intermittently gripped along opposite longitudinal edges thereof by elongated gripping means 64 and 66 and fed beneath the plungers when the plungers are raised and held by the gripping means during a container forming operation. Any suitable means is provided for actuating the gripping means, and this actuating means may include a pair of double acting hydraulic cylinders 68 and 70 which operate pistons connected to the gripping means by rods 72 and 74. In order to maintain the proper tension in the plastic sheet emerging from the extruding apparatus while the forward end of the sheet is held stationary beneath the plungers during the container forming operation, a roller 76 is provided for engaging the sheet, which roller is resiliently biased, by means not shown, against the sheet. As will be understood, when the forward end of the sheet is held stationary by the gripping means, the roller will press against the sheet and form a loop therein whereby the proper tension is maintained in the sheet, and when the sheet is being advanced by the gripping means, the roller will retract so that the portion of the sheet forming a loop may be advanced and the loop will be eliminated. In order to enable the sheet to be drawn into the containers in the manner described below, the sheet must be at the proper temperature. Therefore, suitable heating means such as an electric radiant heater 78 is mounted over the sheet adjacent the container forming work station, and since the portion of the sheet beneath the heater will be stationary while containers are being formed from a preceding portion, the entire portion of the sheet beneath the heater will be heated uniformly to the desired temperature. It should be noted that the gripping members 64 and 66 slide on guides 80 and 82 which are positioned so that the heated plastic sheet is supported above and spaced from the molds 30 so as to avoid premature localized cooling of the sheet. If such localized cooling were permitted prematurely, the subsequently formed containers would have undesirable relatively thick beads and flow lines therein at the areas of the localized cooling.

After a forming operation has been completed and the formed containers have been severed from the plastic sheet in the manner which will be described in detail below, the hydraulic cylinder 32 is actuated to shift the platen 28 to the position shown in Fig. 2 and to the broken line position shown in Fig. 1. In this position, the platen 28 is in alignment with a platen 84 which carries a plurality of ejector pins 86. The platen 84 is adapted to be raised and lowered by a hydraulic cylinder 88. When the platen 84 is raised, the ejector pins pass upwardly through apertures in the bottoms of the molds, and raise the containers from the molds. At the same time a blast of air is directed from a plurality of orifices 90 in a pipe 92 connected with a source of air pressure, not shown, so as to blow the ejected containers across the platen 28 and onto a chute or conveyor, not shown, at the side of the apparatus 20.

In Fig. 7 there is shown a container 94 which may be formed by utilizing the novel method and apparatus of this invention, which container is relatively deep as compared with its diameter and may, for example, be used as a disposable drinking cup in the same manner as disposable drinking cups heretofore made from paper stock. In order to permit cups, such as the cup 94 which is made from plastic, to compete commercially with generally similar cups made from paper, it is necessary that the weight of plastic material in the cup 34 be held to a minimum, or in other words, it is necessary to make the walls of the cup 94 very thin. It has been found that by utilizing the method and apparatus of the present invention, the cup 94 may be formed with a wall which is as thin or thinner than the paper used in many known cups, and may, for example, be on the order of .004 (four thousandths) of an inch.

One embodiment of the novel mold, plungers and dies of this invention is shown in detail in Figs. 4, 5, 6 and 8. More specifically, the mold 30 preferably includes a main body portion 96 which is formed from a relatively low-cost metal and a die ring 98 formed from hardened steel. The main body and die ring combine to provide a mold cavity 100 which has the shape of the article to be formed. In order to permit air to escape uniformly from all portions of the mold cavity during formation of the article, a plurality of vent passageways 102 is formed in the bottom of the body member 96. These passageways are circularly arranged and are preferably positioned adjacent the outer wall of the mold. An aperture 104 is also provided through the bottom of the mold for accommodating an ejector pin.

The plunger and die assembly 40 includes a die block 106 abutting the platen 42 and an elongated plunger 108 extending from the die block and secured to the platen by a bolt 110. It is to be noted that the diameter and length of the plunger are substantially less than the corresponding dimensions of the mold cavity so that when the plunger is moved from the position shown in Fig. 4 to the position shown in Fig. 6, it avoids pressing any part of the plastic sheet against any portion of the mold cavity wall. Thus, the plunger serves to stretch or draw the sheet material surrounding the mold into the mold cavity and partially preform the container. After initial formation of the container is accomplished by the plunger, air under pressure is introduced substantially uniformly into substantially all portions of the partially formed container so as to expand and press the container wall against the wall of the mold cavity. In order for the air under pressure to be effective it is, of course, necessary to seal the upper end of the partially formed container and the manner of providing this seal in accordance with the present invention is shown in Fig. 8. More specifically, the die ring 98 includes an upstanding annular flange 112 having a rounded upper edge over which the sheet material is formed to provide the container or cup with a lip 114. In addition, the die ring 98 is provided with an annular shoulder 116 having a width substantially equal to the thickness of the plastic sheet material and an annular gripping and shearing edge 118. The die block 106 includes an annular axially extending flange 120 having a gripping and shearing edge 122 adapted to cooperate with the gripping and shearing edge 118 and the die ring 98 is recessed as at 124 for receiving the flange 120 in the manner to be described.

During the initial formation of the container by the plunger, the platen 42 is lowered until the die ring 98 and die block 106 are relatively disposed as shown in Fig. 8. It should be noted that in this position, the edge 122 is slightly above the edge 118 while at the same time both of these edges dig into the plastic sheet material so as to provide a seal. When this seal has been perfected, air under pressure may be introduced into the partially formed container for expanding it against the wall of the mold. The air under pressure is directed through a flexible conduit 126, shown in Fig. 1, to passageway means 128 formed in the platen. The conduit 126 is, of course, connected with a suitable source of air pressure, not shown. The passageway means 128 is connected by a short passageway 130 with a recess 132 formed in the die block 106 and from the recess the air is directed through a plurality of ports 134 into the hollow plunger. The plunger is provided with numerous air passageways 136 in its sides and bottom for directing the air into the partially formed container. In accordance with an important feature of the present invention, the plunger is covered with a closely woven fabric 138 which may be made of cotton, nylon and the like, and which may be retained in position by an elastic band 140. This fabric covering serves to diffuse the air flowing through the passageways 136 so that the air is distributed evenly throughout the partially formed container. This fabric covering is important since it has been found that thin wall plastic containers or cups of the type contemplated herein cannot be satisfactorily formed when jets of air from the passageways 136 are not diffused, since such jets will form localized bumps and ridges in the sheet material and in addition will cause objectionable irregularities of flow lines and wall thickness in the finished container.

Since the diffused air under pressure acts uniformly on all portions of the sheet material, substantially the entire wall and the bottom of the cup 94 may be formed with a substantially uniform thickness. However, in some cases it may be desirable to provide certain portions of the cup with a greater wall thickness than other portions for added strength and this may be accomplished by varying the size and shape of the plunger. For example, a relatively long plunger of the type shown in Figs. 4 and 6 will draw a relatively great amount of plastic material to the bottom of the mold so that the cup will have a relatively thick bottom while a relatively short plunger will not draw as much material into the mold so that the cup will have a relatively thin bottom while the upper portion of the cup will be relatively thick and rigid. However, by using a plunger having a rounded or semicircular end, the material is drawn into the mold so that the final cup or container will have substantially uniform thickness throughout its wall and bottom. The plunger shown in Figs. 4 and 6 has a partially rounded end to promote the formation of a cup having a wall with a uniform thickness from the bottom up while the bottom of the cup may be relatively thick.

After the cup or container has been formed in the manner described above and cooled by the air under pressure, which cooling is sufficiently accomplished in one or two seconds, the lip of the cup is sheared from the surrounding portion of the sheet material. In accordance with the present invention, this shearing is accomplished by first raising the platen 42 by introducing hydraulic fluid under pressure to the lower end of the cylinder 48 and then allowing the platen 42 to fall until the shearing edge 122 passes the edge 118 and cooperates therewith to sever the plastic sheet. By utilizing the impact force of the relatively rapidly falling die 106 to sever the sheet material rather than merely attempting to force the die slowly downwardly from its original gripping position shown in Fig. 8, any danger of cracking the lip of the cup is substantially eliminated. Of course, it is understood that suitable timing and control valve means is provided in the control panel 58 for first actuating the platen 42 so that the edges 118 and 122 grip the sheet material as shown in Fig. 8, for then introducing air under pressure into the mold, for then raising the platen, and finally for allowing the platen to fall to the position shown in Fig. 6 for shearing the sheet material and subsequently raising the platen to permit removal of the finished containers and feeding of the sheet material.

In Figs. 9 and 10 there is shown a modified form of the novel mold, plunger and die means of the present invention which is especially adapted to form the plastic container 150 shown in Fig. 11. In this embodiment, the mold is provided with a main body 152 and a die ring 154 which are substantially identical to the above described corresponding elements except that the mold cavity 156 is shallower. This embodiment includes a die plate 158 which is identical to the above described die plate 106 and a plunger 160 which differs essentially in that it is rounded or semi-spherical in shape. With a plunger of this shape, the walls and bottom of the container 150 may be formed with a substantially uniform thickness throughout. It should be noted that in this embodiment a fabric cover 162 is also provided on the plunger 160 for diffusing the air passing through the ports 164 into the partially formed or drawn container. In addition, another feature of this invention is illustrated in this embodiment. More specifically, a relatively coarsely woven metallic fabric 166 is provided on the plunger over the fabric 162, and this metallic fabric serves to emboss criss-cross ribs 168 and 170 on the plastic sheet during the initial forming or drawing of the sheet by the plunger so as to add strength and rigidity to the finished thin-walled container. It should be noted that these criss-cross ribs are located on the interior surface of the container so that they do not detract from the appearance and therefore from the marketability of the container. While for the purpose of illustrating the present invention the metallic cloth has only been shown in the embodiment of Figs. 9 and 10, it should be understood that the metallic cloth may also be used to cover the plunger of the above described embodiment as well as the plunger of the embodiment to be described below, so that portions of the containers formed in accordance with these embodiments may be reinforced with internal criss-cross ribs.

Figs. 12 and 13 show another embodiment of the present invention wherein the mold and plunger are especially adapted for forming containers having restricted mouths such, for example, as bottle-like containers. In this embodiment, the die plate 172 and plunger 174 carried by the platen 42 may be substantially identical to the above described die plate 106 and plunger 108 and need not be described in detail. It is, of course, understood that the plunger 174 is covered with a fabric for diffusing the air and may also be covered with a metallic fabric of the type described above, if desired. The mold of this embodiment is split so that the finished bottles may be removed, and therefore includes complementary main body portions 176, 178 and complementary die ring portions 180 and 182. The two halves of the mold are slidably supported on rods 184 and 186, which rods are carried by bracket members 188 and 190 adapted to be mounted on the reciprocable platen 28. The mold parts are provided with pairs of opposing bores in which compression springs 192 and 194 are disposed for yieldingly urging the mold parts to an open position. Rollers 196 and 198 are mounted on the mold parts 176 and 178 respectively for engagement with cam fingers 200 and 202 depending from the platen 42. As will be understood, when the platen is lowered, the cam fingers engage the rollers and force the mold parts together whereupon the bottle is formed in substantially the same manner as the containers described above, and when the platen 42 is raised the cam fingers are disengaged from the rollers so that the mold parts spread apart to permit ejection of the bottle. Fig. 15 is a somewhat diagrammatic view showing a multiple cavity mold structure incorporating the essential features of the mold shown in Figs. 12 and 13.

A brief résumé of the method of forming plastic containers in accordance with the present invention and with the apparatus described above is as follows. A continuous sheet of thermo-plastic material is continuously supplied from an extruding mechanism or other suitable means and is intermittently advanced past a heating station at which it is heated and softened a desired amount, to a work station between one or more molds and one or more complementary plunger and die assemblies. The plastic sheet is supported above and out of contact with the molds, so as to prevent premature localized cooling thereof. Then the molds and plungers are relatively advanced toward each other so that the plungers draw the plastic material into the molds and partially form the containers. Then the upper ends of the partially formed containers are sealed by means which is subsequently used to sever the containers from the sheet, and air under pressure is directed to the plungers and is diffused substantially uniformly throughout the interiors of the partially formed containers so that all portions of the partially formed containers are uniformly acted upon by the air under pressure and are pressed against the walls of the mold cavities. In certain instances, the interior surfaces of the containers may be embossed during the initial preforming thereof by the plunger so as to provide strengthening and rigidifying ribs. The air under pressure also effects rapid cooling of the plastic material so shat as soon as the plastic material has been forced against the walls of the mold cavities, the air under pressure may be shut off and the plungers may be raised. Then the finished containers are severed from the sheet material while at said container forming work station and by utilizing the die means initially used to seal the upper ends of the container. Finally, the containers are ejected from the mold, and the waste portions of the plastic sheet may be severed from the remainder of the sheet and after appropriate treatment returned to the extrusion machine.

While the preferred embodiments of the present invention have been shown and described herein, it is obvious that many structural details may be changed without departing from the spirit and scope of the appended claims.

The invention is claimed as follows:

1. The method of forming hollow articles such as containers and the like from a sheet of thermoplastic material which comprises supporting a sheet of thermoplastic material at a temperature high enough for such material to be readily deformable, mechanically forming a rim of a prospective article in the material of said sheet and thereby anchoring the material within said rim, mechanically drawing the material within said rim from said sheet to form a partially completed article, sealing off said partially completed articles substantially about the periphery thereof, establishing a differential of fluid pressure across the material of said partially completed article, there being a greater pressure within than without said sealed off partially completed article whereby further to deform said article substantially to completion, and cutting the sheet about the periphery of the rim while said article is in sealing and deforming position to separate the article from the sheet.

2. Apparatus for forming hollow articles such as containers and the like from thermoplastic material comprising a mold having a cavity therein, means for supporting a heated sheet of such thermoplastic material adjacent said mold transverse of said cavity and aligned therewith, a mandrel disposed opposite to said mold cavity, means for advancing said mandrel against said sheet and into said mold cavity to draw material from said sheet to form a partially completed article, means for mechanically forming a rim in said sheet about a prospective article and thereby anchoring the drawn material, means sealing off the partially completed article adjacent said rim, means for establishing differential fluid pressure across the drawn material with greater pressure within the partially completed article than without whereby to expand said partially completed article into substantial completion against the interior of said mold cavity, and means for cutting said article from said sheet immediately about said rim with said article in said mold cavity.

3. Apparatus for forming hollow articles such as containers and the like from thermo-plastic material comprising a mold having a cavity therein, means for supporting a heated sheet of such thermo-plastic material adjacent said mold transverse of said cavity and aligned therewith, a mandrel disposed opposite to said mold cavity, means for advancing said mandrel against said sheet and into said mold cavity to draw material from said sheet to form a partially completed article, means for forming a rim in said sheet about a prospective article and for simultaneously clamping the formed rim, means sealing off the partially completed article adjacent said rim, means for establishing differential fluid pressure across the drawn material with greater pressure within the partially completed article than without whereby to expand said partially completed article into substantial completion against the interior of said mold cavity, and means for cutting said article from said sheet immediately adjacent said rim with said article in said mold cavity.

4. Apparatus for forming hollow articles such as containers and the like from thermo-plastic material comprising a mold having a cavity therein, means for supporting a heated sheet of such thermo-plastic material adjacent said mold transverse of said cavity and aligned therewith, a mandrel disposed opposite to said mold cavity, means for advancing said mandrel against said sheet and into said mold cavity to draw material from said sheet to form a partially completed article, means for drawing said plastic sheet over and around an upstanding projection and for simultaneously clamping the part so drawn, means sealing off the partially completed article adjacent said rim, means for establishing differential fluid pressure across the drawn material with greater pressure within the partially completed article than without whereby to expand said partially completed article into substantial completion against the interior of said mold cavity, and means for cutting said article from said sheet immediately adjacent said rim with said article in said mold cavity.

5. Apparatus for forming hollow articles such as containers and the like from thermo-plastic material comprising a mold having a cavity therein and having an upstanding annular projection about the cavity, means for supporting a heated sheet of such thermo-plastic material adjacent said mold transverse of said cavity and aligned therewith, a mandrel disposed opposite to said mold cavity, means for advancing said mandrel against said sheet and into said mold cavity to draw material from said sheet to form a partially completed article, folding means for engaging said plastic sheet to fold a part of said plastic sheet over said upstanding projection to form a rim of a prospective article over said projection, said folding means including an annular surface spaced radially from said upstanding projection a distance less than the thickness of the plastic sheet whereby to compress the plastic sheet and seal the plastic sheet against the upstanding projection, said folding member and said upstanding projection having complementary cutting edges for cutting the article from the sheet subsequent to the folding and with the article in the mold cavity, and means for establishing differential fluid pressure across the drawn material with greater pressure within the partially completed article than without whereby to expand said partially completed article into substantial completion against the interior of said mold cavity.

6. The method of forming hollow articles such as containers and the like from a sheet of thermoplastic material which comprises supporting a sheet of thermo-plastic material at a temperature high enough for such material to be readily deformable, forming a rim of a prospective article in the material of said sheet and thereby anchoring the material within said rim, mechanically drawing the material within said rim from said sheet to form a partially completed article, sealing off said partially completed article substantially about the periphery thereof, establishing a differential of fluid pressure across the material of said partially completed article, there being a greater pressure within than without said sealed off partially completed article whereby further to deform said article substantially to completion, and cutting the sheet adjacent the periphery of the rim while said article is in sealing and deforming position to separate the article from the sheet.

References Cited in the file of this patent
UNITED STATES PATENTS

| | | | |
|---|---|---|---|
| 208,097 | House | Sept. 17, | 1878 |
| 1,531,504 | Roberts | Mar. 31, | 1925 |
| 1,592,536 | O'Neil | July 13, | 1926 |
| 1,779,813 | Hazell | Oct. 28, | 1930 |
| 1,871,296 | Battin | Aug. 9, | 1932 |
| 2,007,548 | Sampson | July 9, | 1935 |
| 2,230,189 | Ferngren | June 28, | 1941 |
| 2,255,117 | Helmstaedter | Sept. 9, | 1941 |
| 2,282,423 | Kopitke | May 12, | 1942 |
| 2,295,066 | Weikert | Sept. 8, | 1942 |
| 2,354,916 | Hurt | Aug. 1, | 1944 |
| 2,589,419 | Moncrieff | Mar. 18, | 1952 |
| 2,736,065 | Wilcox | Feb. 28, | 1956 |
| 2,749,572 | Nowak | June 12, | 1956 |